United States Patent [19]

Stansfield et al.

[11] Patent Number: 4,922,544
[45] Date of Patent: May 1, 1990

[54] IMAGE PROCESSING

[75] Inventors: Peter W. Stansfield, Hatfield; Alastair Reed, Buzzard, both of England

[73] Assignee: Crosfield Electronics Limited, London, England

[21] Appl. No.: 94,773

[22] Filed: Sep. 10, 1987

[30] Foreign Application Priority Data

Sep. 12, 1986 [GB] United Kingdom ................ 8621994

[51] Int. Cl.$^5$ .............................................. G06K 9/36
[52] U.S. Cl. ..................................... 382/56; 364/522; 364/726; 382/43
[58] Field of Search ............................. 382/56, 41, 43; 364/576, 726, 827, 723, 521, 522; 358/138, 135, 426, 261.1, 262.1, 432

[56] References Cited

U.S. PATENT DOCUMENTS

| 4,698,689 | 10/1987 | Tzou ..................................... 382/56 |
| 4,707,738 | 11/1987 | Ferre et al. ......................... 358/135 |
| 4,751,742 | 6/1988 | Meeker ................................. 364/723 |
| 4,754,492 | 6/1988 | Malvar ................................. 382/56 |

OTHER PUBLICATIONS

Bracewel, "The Fourier Transform and its Applications", second edition, McGraw-Hill Int. Book Co., pp. 250-253.
"Spatial Transform Coding of Color Images", William K. Pratt, IEEE Transactions on Communication Technology, vol. COM-19, No. 6, Dec. 1971.
"A Color Facsimile System which can be Economically Implemented with a Microprocesssor", Dr. Robert D. Solomon, Technologie de Pointe Pour le Traitement des Signaux, Oct. 1975.

Primary Examiner—Leo H. Boudreau
Assistant Examiner—Joseph Mancuso
Attorney, Agent, or Firm—Sughrue, Mion, Zinn, Macpeak & Seas

[57] ABSTRACT

A method and apparatus for processing original data defining the values of pixels of an original colored image represented in a spatial domain by two or more color separations each color separation defining the respective color component content of pixels arranged in a two dimensional array extending in X and Y directions. The apparatus comprises a store 6 for storing the original data; and a frequency transform circuit 8 for performing a three dimensional transformation on the store representation to generate transformed data representing the original image in three dimensional frequency space. Two of the three dimensions represent the variation in pixel value in the X direction and the Y direction respectively and the transformed data has a single zero order frequency term.

11 Claims, 2 Drawing Sheets

IMAGE PROCESSING

FIELD OF THE INVENTION

The invention relates to methods and apparatus for processing images.

DESCRIPTION OF THE PRIOR ART

Conventionally, a coloured image is represented by a number of colour separations each defining the respective colour content of each pixel of the original image. Original images are usually defined with a large number of pixels, for example 90000 per square inch. This leads to a very large quantity of data being required to represent the image. Although this is acceptable in colour correction systems and the like, it is not generally acceptable when it is desired to store the data or to transmit the data to a remote site. In these cases, it is common practice to compress the data and one method of compression which has previously been proposed is to transform each colour separation into the frequency domain which results in four two dimensional arrays of data defining the original colour separations in two dimensional frequency space.

One pixel of each array comprises a zero order frequency or DC term while the remaining terms in each array are higher order frequency or AC terms. Various coding techniques are then performed to reduce or compress the data even further and the compressed versions are stored or transmitted. At the remote site or when stored data is to be retrieved, the data is decompressed and then transformed back into the spatial domain to regenerate the original colour separation data.

An example of this known technique is described in "Spatial Transform Coding of Color Images", IEEE Transactions on Communication Technology, Vol COM-19, No. 6, Dec 1971, pp 980–992.

Although the above process produces a significant data compression, it is still necessary to store a DC term for each of the colour separations. Furthermore, although a number of the AC terms can be discarded from each array, there is still a large number of these AC terms which has to be encoded.

SUMMARY OF THE INVENTION

In accordance with one aspect of the present invention, a method of processing data defining the values of pixels of an original coloured image represented in the spatial domain by two or more colour separations, each colour separation defining the respective colour component content of pixels arranged in a 2 dimensional array extending in X and Y directions, comprises performing a three dimensional transformation on the data to generate transformed data defining the original image in three dimensional frequency space, two of the three dimensions representing the variation in pixel value in the X direction and in the Y direction respectively, and wherein the transformed data has a single zero order frequency term.

The invention leads to a further considerable increase in the degree of data compression obtainable. The performance of the three dimensional transform results in a single zero order frequency or DC term and has the effect of automatically compressing the higher order frequency or AC terms generated by the prior art method. Furthermore, the number of significant AC terms is less than the total number of significant AC terms generated in the conventional method.

The third dimension will represent a "colour direction" corresponding to the variation in colour component content of the same pixel, e.g. the variation from cyan to magenta to yellow and to black.

The type of transformation used may be any convenient type such as a fourier transform, cosine transform and the like.

The transformed data may be stored directly or after further compression (e.g. run length encoding) or alternatively signals related to the transformed data may be transmitted.

In accordance with a second aspect of the present invention, a method of processing transformed data representing an original coloured image in three-dimensional frequency space produced by a method according to the first aspect of the invention comprises performing an inverse transformation on at least part of the transformed data to generate spatial data defining a representation of the original image in the spatial domain.

One of the advantages of representing an original image in three-dimensional frequency space is that since the axes of the representation in the spatial domain are orthogonal (due to there being the same number of pixels in each colour separation), the axes in the transform domain are also orthogonal so that one of the planes of the representation in the transform domain containing the DC term defines all luminance-like information. The plane concerned is that extending in the directions representing variation in pixel value in the X and Y directions. It is therefore possible to reproduce from the transformed representation either the full coloured original image (by applying a three-dimensional inverse transform) or a monochrome version of that image simply by performing a two-dimensional inverse transform on that plane containing the DC term and luminance-like information. This also means that after performing a method in accordance with the first aspect of the invention, the plane of the representation in three dimensional frequency space containing the DC term may be stored or transmitted by itself since it contains useful information.

The three dimensional transformation or the three or two dimensional inverse transformation may be carried out directly on the data but is preferably performed in a series of one dimensional transformations. This is particularly appropriate where the invention is performed by a suitably programmed computer. It has been shown in "The Fourier Transform and its Applications" by R N Bracewell, pages 251–253 that carrying out a series of one dimensional transformations in each of three orthogonal directions is equivalent to a single three dimensional transformation. The three sets of transformations can be carried out in any order.

In accordance with a third aspect of the present invention, apparatus for processing original data defining the values of pixels of an original coloured image represented in the spatial domain, by two or more colour separations, each colour separation defining the respective colour component content of pixels arranged in a 2 dimensional array extending in X and Y directions comprises a store for storing the original data; and first processing means for performing a three dimensional transformation on the stored data to generate transformed data representing the original image in three dimensional frequency space, two of the three dimensions representing the variation in pixel value in the X direction and in the Y direction respectively, wherein the transformed data has a single zero order frequency term.

In accordance with a fourth aspect of the present invention, apparatus for processing data representing an image in three dimensional frequency space produced by a method according to the first aspect of the invention or apparatus according to the third aspect of the invention comprises second processing means for performing an inverse transformation on at least part of the image representation to generate data defining a representation of the original image in the spatial domain.

Typically one or both of the first and second processing means will comprise suitably programmed computers.

It has been realised that the representation of an image in three dimensional frequency space leads to further significant advantages. It has already been mentioned above that one of the planes of the representation containing the DC term represents a luminance-like measure of the image. In addition, due to the orthogonal nature of the transformation, certain directions through the three dimensional representation will represent particular colour components of the image. It is therefore a simple matter to modify that colour component simply by modifying the data within the three dimensional transformation in the direction concerned. This would simplify considerably colour correction techniques.

BRIEF DESCRIPTION OF THE DRAWINGS

Some examples of methods and apparatus in accordance with the present invention will now be described in accordance with the accompanying drawings, in which.

DETAILED DESCRIPTION OF THE EMBODIMENTS

Figure 1:
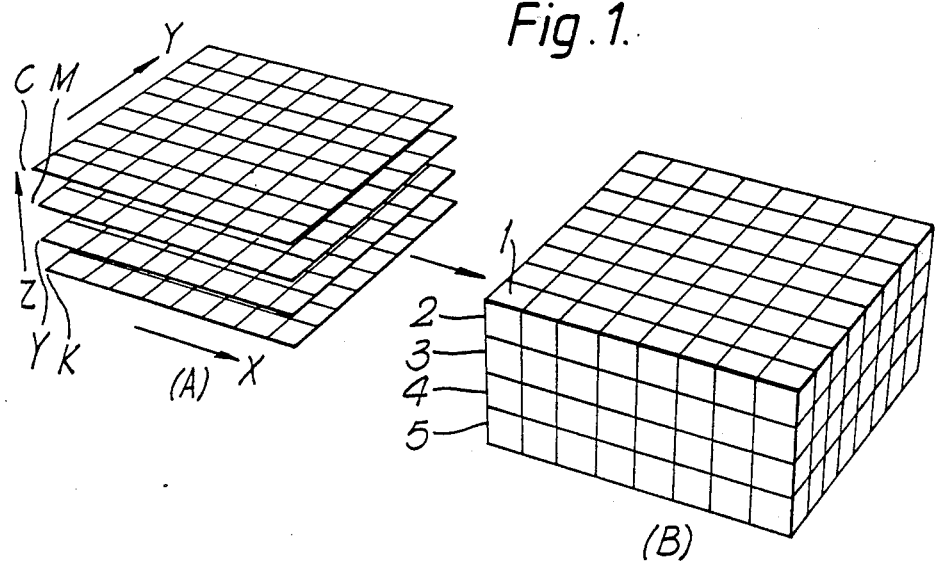
FIGS. 1A and 1B illustrate diagrammatically the representation of part of an image in the spatial and frequency domains respectively.

In conventional colour image processing, an original coloured image is represented by a number of colour separations. The colour content of each pixel of the original image is defined in terms of colour components such as cyan, magenta, yellow and black (C,M,Y,K) and these are indicated schematically in FIG. 1A by respective planes. The colour separation representation can be considered to extend in X, Y and Z directions, the Z direction representing a "colour dimension". The invention takes 3 dimensional blocks of pixels of the original image as defined in the four colour separations and performs a three dimensional transformation on each block so as to produce a representation of the block in three dimensional frequency space as diagrammatically illustrated in FIG. 1B. Typically, blocks of $8 \times 8$ pixels will be selected resulting in blocks of $8 \times 8 \times 4$ elements of spatial data to be transformed. These will transform into a block of $8 \times 8 \times 4$ elements of transformed data having a single DC element 1 and a series of AC elements. The elements in the transform domain can be considered as being arranged in four planes 2-5, each plane containing 64 elements. The topmost plane 2 containing the DC element 1 defines a luminance-like measure of the original image while the remaining planes 3-5 contain colour information.

The advantage of the three dimensional transformation is that there is only a single DC term 1 which must be coded directly while a large number of the AC terms can be discarded without seriously affecting the appearance of an image reproduced from the transformed data.

Figure 2:
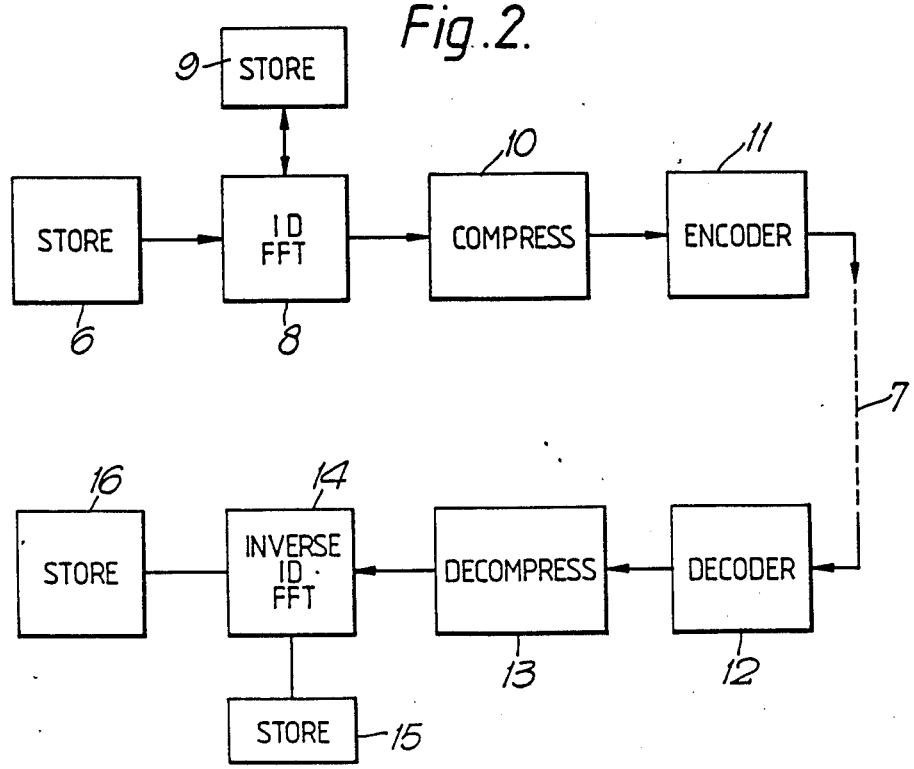
FIG. 2 is a block diagram of an example of apparatus according to the invention for compressing, transmitting, and decompressing data representing an image;. and, FIG. 3 and 4 are flow diagrams illustrating the operation of computers for performing examples of compression and decompression methods according to the invention.

FIG. 2 illustrates in block diagram form apparatus for compressing and encoding an original image stored in a store 6 and for transmitting the encoded data along a link 7 to decompressing apparatus. The communication link may be a hard wired link or a radio or satellite communication link.

Figure 3:
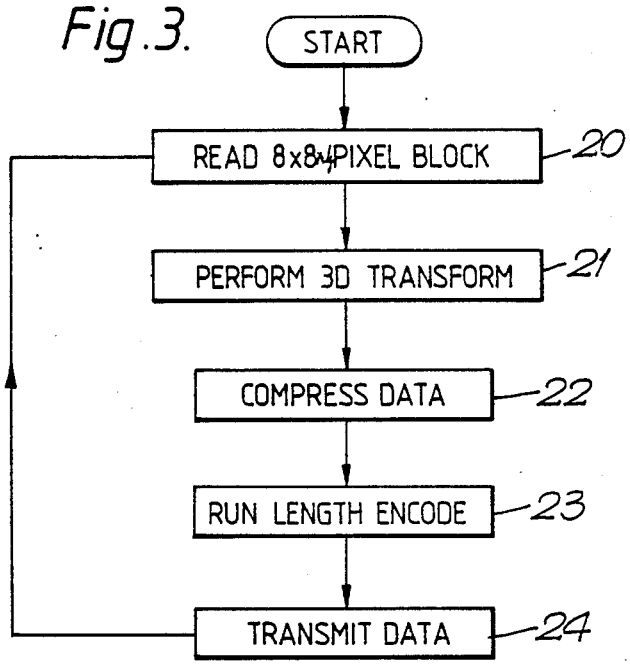
Figure 4:
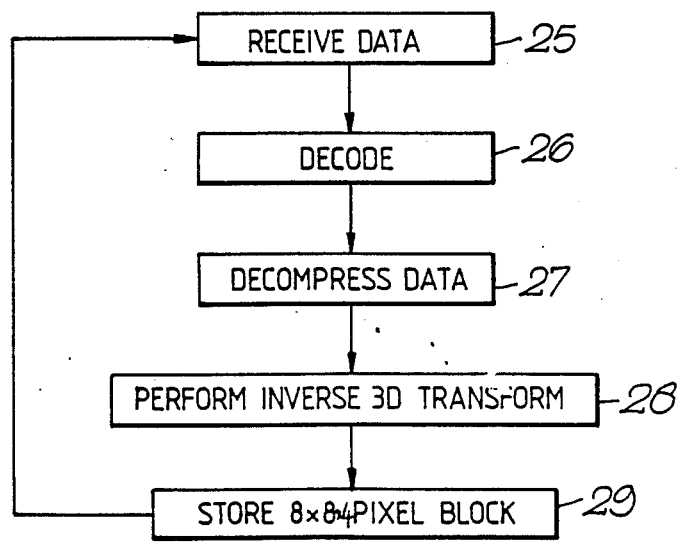

The functions performed by the components of FIG. 2 can also be carried out by suitably programmed computers as indicated by the flow diagrams in FIGS. 3 and 4. In this description of FIG. 2 the equivalent step numbers in FIGS. 3 and 4 will also be mentioned.

The store 6 contains the original pixel data defining the original coloured image in terms of four colour separations. Corresponding $8 \times 8 \times 4$ blocks of this data from the four colour separations are fed (step 20) to a one dimensional fast fourier transform (FFT) circuit 8 which, in conjunction with a store 9 applies 20 one dimensional transforms to the block of data (step 21). For example an eight point one dimensional transform from the store 9 is applied in succession along the eight rows of pixels of the original spatial data, writing data back to where it was read from, then along the eight orthogonal columns, writing data back and then a four point transform is performed four times through the "depth" of the original spatial data across the four colour separations. As is shown in the article mentioned above, this is equivalent to the application of a three dimensional fourier transform to the entire $8 \times 8 \times 4$ block of pixel data.

The resulting block of transformed data (FIG. 1B) is fed to compression circuitry 10 where additional data compression is performed (step 22). This may include, for example, the discarding of some of the AC elements by comparison with a predetermined threshold (AC elements with magnitudes less than the threshold being discarded), normalisation and the like. The compressed data is then fed in series to an encoder 11 where it is encoded (step 23) in a conventional manner using for example a modified Huffman system (run length encoded). The encoded data is then transmitted (step 24) along the communication link 7 to a remote receiving site. This is then repeated for the remaining pixels in $8 \times 8 \times 4$ blocks.

At the remote receiving site the transmitted data is recieved (step 25) and fed in blocks to a decoding circuit 12 where the run length encoded data is decoded (step 26). The decoded data is then decompressed (step 27) into a circuit 13 (e.g. to reverse previous normalisation (step 26) and fed to an inverse one dimensional FFT circuit 14 which, in conjunction with a store 15 performs a series of one dimensional inverse fourier transforms on the data (step 28) to regenerate the original spatial data defining the colour content of pixels of the image in terms of four colour separations. This regenerated spatial data is stored (step 29) in a store 16.

We claim:

1. A method of processing data defining the values of pixels of an original coloured image represented in the spatial domain by at least two colour separations, each colour separation defining the respective colour component content of pixels arranged in a 2 dimensional array extending in X and Y directions, the method comprising performing a three dimensional transformation on said data to generate transformed data defining said original image in three dimensional frequency space, two of said three dimensions representing the variation in pixel value in said X direction and in said Y direction respectively, and wherein said transformed data has a single zero order frequency term.

2. A method according to claim 1 comprising performing said three dimensional transformation by a series of one dimensional transformations.

3. A method of processing transformed data representing an original coloured image in three-dimensional frequency space produced by a method according to claim 1, which comprises performing an inverse transformation on at least part of said transformed data to generate spatial data defining a representation of said original image in said spatial domain.

4. A method according to claim 3 comprising performing said inverse transformation by a series of one dimensional inverse transformations.

5. Apparatus for processing original data defining the values of pixels of an original coloured image represented in the spatial domain by at least two colour separations, each said colour separation defining the respective colour component content of pixels arranged in a 2 dimensional array extending in X and Y directions, the apparatus comprising a store- for storing said original data; and first processing means for performing a three dimensional transformation on said stored data to generate transformed data representing said original image in three dimensional frequency space, two of said three dimensions representing the variation in pixel value in the X direction and in the Y direction respectively, and wherein said transformed data has a single zero order frequency term.

6. Apparatus according to claim 5, wherein said first processing means includes means for performing said three dimensional transformation by a series of one dimensional transformations.

7. Apparatus according to claim 6 for processing data representing an image in three dimensional frequency space further comprising second processing means for performing an inverse transformation on at least part of said image representation to generate data defining a representation of said original image in the spatial domain.

8. Apparatus according to claim 7, wherein said second processing means includes means for performing said inverse transformation by a series of one dimensional inverse transformations.

9. Apparatus according to claim 5, wherein said first processing means comprises a computer.

10. Apparatus according to claim 5, wherein said second processing means comprises a computer.

11. Apparatus for processing data representing an image in three dimensional frequency space produced by apparatus according to claim 5, comprising second processing means for performing an inverse transformation on at least part of said image representation to generate data defining a representation of said original image in the spatial domain.

* * * * *